July 31, 1928.
J. A. LEEPER ET AL
1,679,041
ELECTRIC WELDING MACHINE
Filed Nov. 23, 1925
3 Sheets-Sheet 1
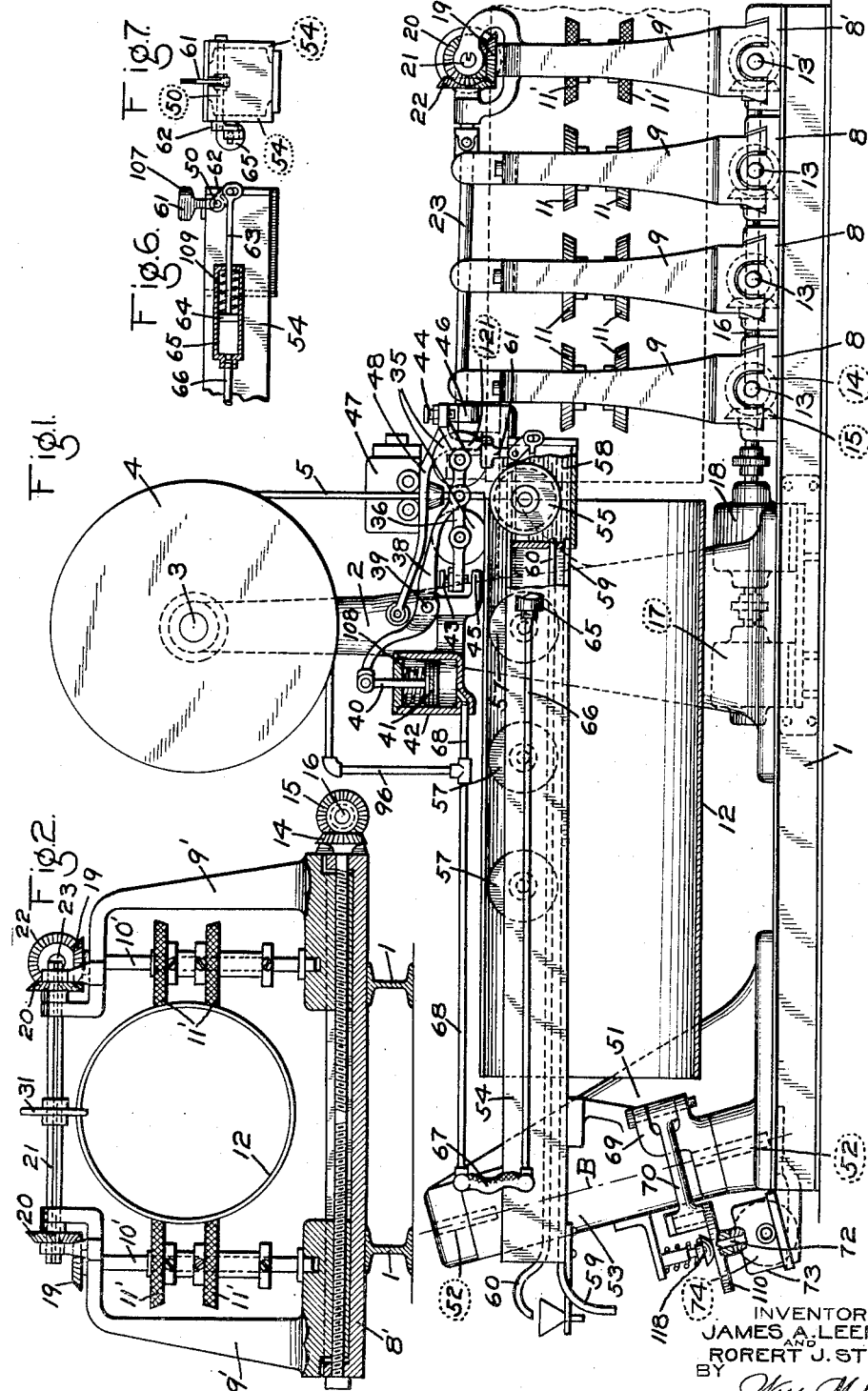
INVENTORS
JAMES A. LEEPER
AND
ROBERT J. STRONG
BY
Wm. M. Cady
ATTORNEY July 31, 1928.
J. A. LEEPER ET AL
1,679,041
ELECTRIC WELDING MACHINE
Filed Nov. 23, 1925
3 Sheets-Sheet 2
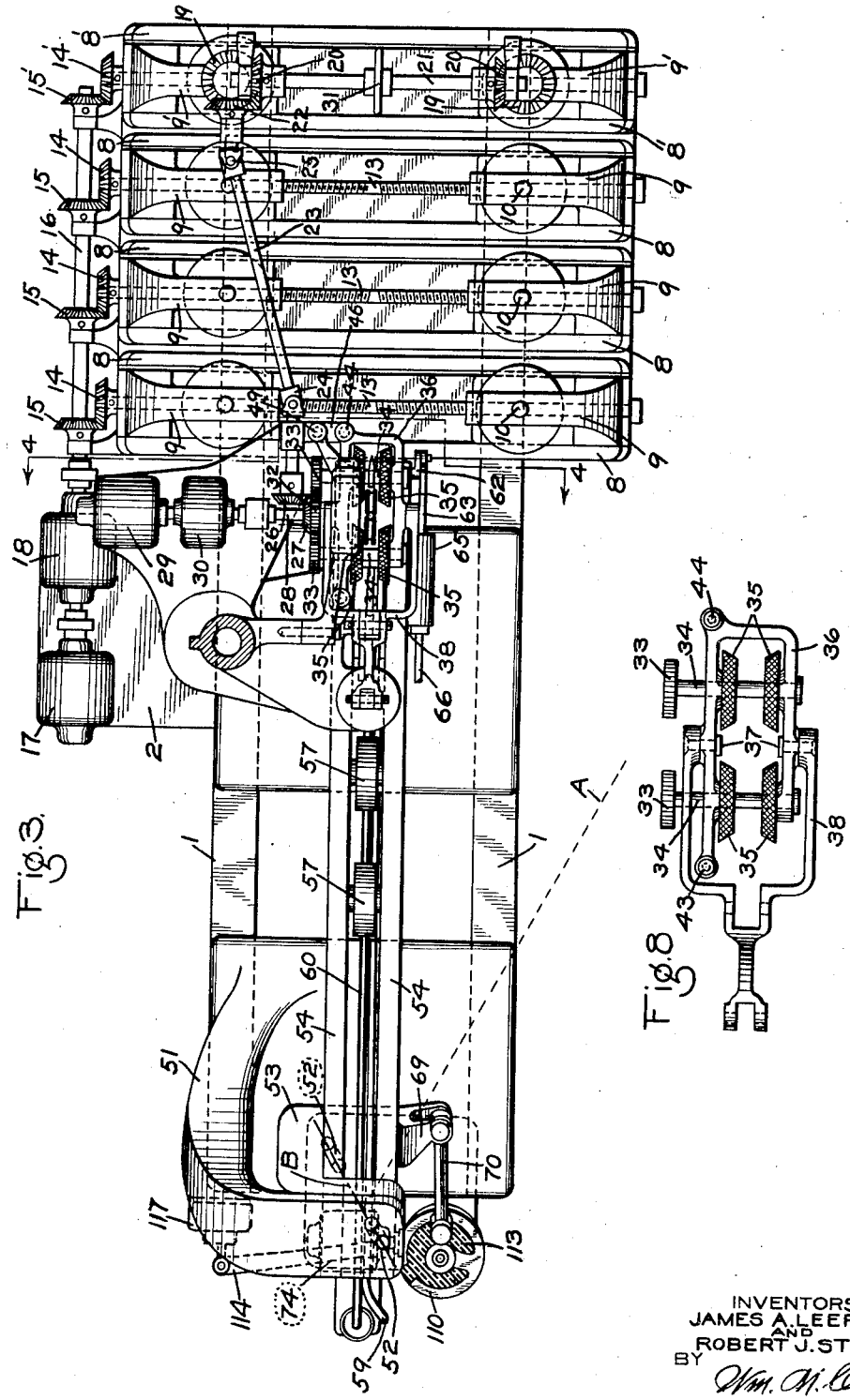
INVENTORS
JAMES A. LEEPER
AND
ROBERT J. STRONG
BY
Wm. M. Cady
ATTORNEY

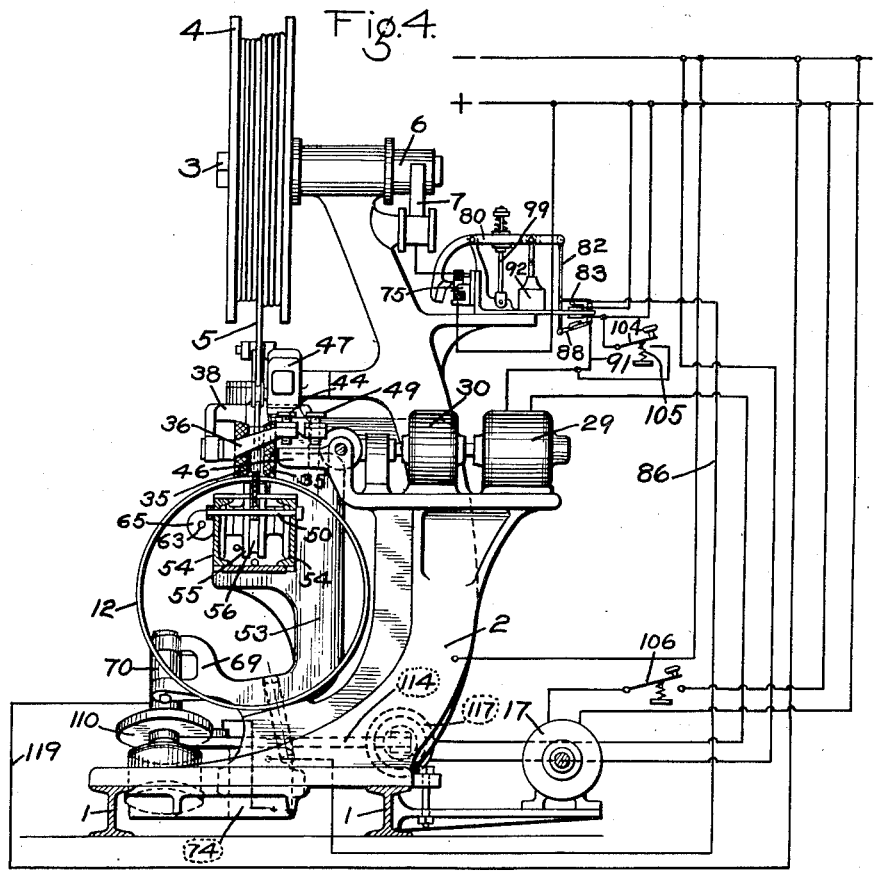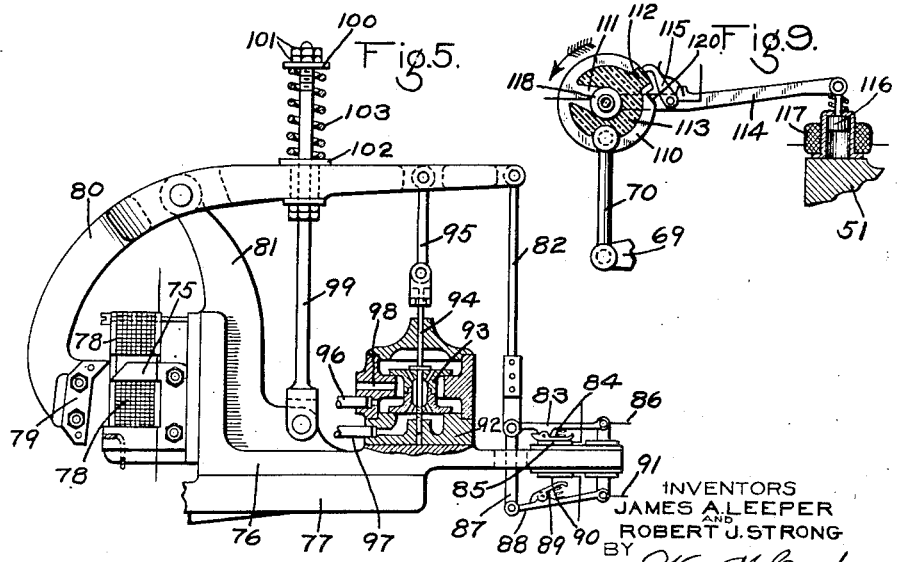

Patented July 31, 1928.

1,679,041

UNITED STATES PATENT OFFICE.

JAMES A. LEEPER, OF WILKINSBURG, AND ROBERT J. STRONG, OF OAKMONT, PENNSYLVANIA, ASSIGNORS TO THE WESTINGHOUSE AIR BRAKE COMPANY, OF WILMERDING, PENNSYLVANIA, A CORPORATION OF PENNSYLVANIA.

ELECTRIC WELDING MACHINE.

Application filed November 23, 1925. Serial No. 70,745.

This invention relates to electric welding machines, and more particularly to a welding machine adapted for welding longitudinal joints in reservoirs, tubes, cylinders, and the like.

The principal object of our invention is to provide a substantially automatically operating electric welding machine for welding joints of the above character.

In the accompanying drawing; Fig. 1 is a side elevational view of an electric welding machine embodying our invention; Fig. 2 an end elevational view, partly in section, of the machine shown in Fig. 1; Fig. 3 a plan view of the welding machine; Fig. 4 a section on the line 4—4 of Fig. 3; Fig. 5 an enlarged detail view of the electro-pneumatic control mechanism of the machine; Fig. 6 a side elevation in detail of the spacer mechanism; Fig. 7 an end view of the spacer mechanism; Fig. 8 a plan view of the cylinder feed mechanism; and Fig. 9 a plan view, partly in section, of the mechanism for controlling the discharge of the welded article from the machine.

As shown in the drawing, the base of the machine may consist of two spaced I beam sections 1, and mounted centrally on said sections is an upright or standard 2. At the upper end of the standard, a bearing is provided for a spindle 3, on which is mounted a reel 4. A fusible metallic electrode rod 5 is wound on the reel and electric current is supplied to the electrode rod by means of a conductor ring 6 and a contact brush 7 engaging the ring.

Mounted on the I beam sections 1 near one end are a plurality of guide blocks 8, each having a transverse guideway for receiving the slide portion of a pair of standards 9. Each standard 9 is provided with bearings for a vertically disposed shaft 10 and mounted on each shaft are spaced guide rollers 11 having their peripheral faces beveled and oppositely disposed, so as to provide supporting and guiding members for the reservoir or tube 12 which is to be welded.

The rollers 11 are adjustable vertically on each shaft 10, so as to accommodate reservoirs of different diameters and for the same purpose, the standards 9 are adjustable laterally. For this purpose a rod 13 is provided having right and left hand threaded sections adapted to have screw-threaded engagement in the guide portions of the standards. Each rod carries at one end a bevel gear 14 which meshes with a bevel gear 15, mounted on a longitudinally disposed shaft 16. Said shaft is adapted to be rotated by means of an electric motor 17, which is operatively connected to the shaft through a gear speed reducing mechanism 18.

The three inner sets of guide rollers 11 merely act as guides for the cylinder 12, but the guide rollers 11' of the outer set are nurled so as to act as driving or feed rolls as well as guide rolls.

For rotating the rollers 11', the vertical shafts 10' are each provided at the upper end with a bevel gear 19 which meshes with a bevel gear 20, carried by a horizontal shaft 21. The bevel gear 19 at one side of the machine also meshes with a bevel gear 22 carried by a longitudinally disposed shaft 23.

The shaft 23 is provided with universal joints 24 and 25 and carries at its inner end, a bevel gear 26, which meshes with a bevel gear 27 secured to a transversely disposed shaft 28. The shaft 28 is driven by an electric motor 29, through a gear speed reducing mechanism 30.

The shaft 21 carries a disk 31 which is adapted to engage in the space between the edges of the cylinder 12 which are to be welded together, the disk serving both to center the cylinder with respect to the electrode and to maintain the space between the edges at a predetermined width.

A gear 32 is secured to the end of the shaft 28 and horizontally disposed gears 33 mesh with the gear 32. Each gear 33 is secured to the end of a shaft 34 and mounted on each shaft is a pair of beveled feed rolls 35, adapted to engage the cylinder 12 at opposite sides of the joint. The shafts 34 have bearings in a frame 36 and said frame is connected by trunnion pins 37 to a forked lever 38. Centrally, the lever 38 is fulcrumed on a pin 39 and the outer end of the lever is pivotally connected to a piston rod 40. Said piston rod is secured to a piston 41 which is contained in a piston cylinder 42. The outer ends of the frame 36 carry set screws 43 and 44 adapted to engage stops 45 and 46 for limiting the rotative movement of the frame.

An electrode rod feeding device 47, of the usual character, is carried by a lever 48, which has one end pivotally mounted on the standard 2 and is provided with a set screw 49 at the opposite end which is adapted to engage the stop member 46 for limiting the movement of the lever.

On the left hand end of the base members 1 an inclined standard 51 is mounted. Said standard provides bearings for trunnion pins 52 which support a rotatable member 53, so that the axis of rotation is inclined to the vertical, as shown in Fig. 1. Secured to the member 53 is the mechanism for supporting the cylinder 12 as it is fed along during the welding operation. Said mechanism may comprise spaced channel members 54 which extend inwardly of the machine to a point somewhat beyond the point where the electrode 5 is fed to the joint.

Pivotally mounted intermediate the channel members 54 is a roller 55, the rotating axis of which is in vertical alinement with the electrode rod 5 and said roll has a peripheral groove 56 which is disposed directly below the joint in the cylinder or reservoir 12. Guide rollers 57 are also pivotally mounted intermediate the channel members 54 for the purpose of supporting the cylinder 12 as it is fed along during the welding operation.

The roll 55 extends into a receptacle 58 formed at the ends of the channel members 54 and said receptacle is adapted to be supplied with water, so that the roll 55 is cooled as it rotates in the liquid bath. Water is supplied to the receptacle 58 through a pipe 59 and circulates back from the receptacle by way of a return pipe 60.

A joint spacing member 61 is mounted between the channel members 54 on a shaft 50 having bearings in said members and is positioned so as to enter into the space between the edges of the cylinder 12 at a point in advance of the position where the electrode rod is fed to the joint.

Secured to an end of the shaft 50 extending through one of the channel members 54 is a crank arm 62, which is connected to a piston rod 63 carrying a piston 64, contained in piston cylinder 65. The cylinder 65 is secured to the adjacent channel member 54 and has a pipe 66 connected thereto. The pipe 66 is in turn connected through a section 67 of flexible hose to a pipe 68.

The rotatable member 53 is provided with a lug 69 to which a connecting rod 70 is pivotally connected and said rod is connected at the opposite end to a ring 110 which is secured to a shaft 72 of a speed reducer 73. The speed reducer is not shown in detail but contains bevel gears through which the shaft 72 is operatively connected to an electric motor 74.

The mechanism for automatically controlling the operation of the electric motors 29 and 74 and the supply and exhaust of fluid under pressure to and from the cylinders 42 and 65, may comprise a magnet 75 secured to a bracket 76 which is mounted on a shelf 77 carried by the standard 2, the coils 78 of the magnet being in the circuit through which current is supplied to the electrode 5, is energized when current flows through the electrode.

The armature 79 of the magnet is secured to one end of a curved lever 80, which is pivotally supported by an arm 81. At the opposite end of the lever 80 a rod 82 is pivotally connected and pivotally connected to said rod is a switch arm 83 carrying a contact member 84, adapted to engage a fixed contact member 85, so that when the contacts 84 and 85 engage, the circuit will be closed through wire 86 to the motor 74.

A link 87 is pivotally connected to the rod 82 and a pivoted contact lever 88 is pivotally connected to the end of the link 87. The lever 88 carries a contact member 89 adapted to engage a fixed contact member 90, so that when the contacts 89 and 90 engage, a circuit will be closed through wire 91 to the motor 29.

A valve casing 92 is mounted on the bracket 76 and contains a balanced poppet valve 93 which is connected to a valve stem 94. The valve stem 94 is pivotally connected to a link 95, which in turn is pivotally connected to the lever 80. A pipe 96 leads from the valve casing and connects with pipe 68, through which fluid under pressure is supplied to the cylinders 42 and 65. A fluid pressure supply pipe 97 is also connected to the valve casing 92 and said pipe is connected to a suitable source of fluid under pressure. When the valve 93 is in the position shown in Fig. 5, pipe 96 is connected to an atmospheric exhaust port 98.

Pivotally connected to the bracket 76 is a rod 99, which extends through an opening in the lever 80 and at the outer end of the rod is provided a spring washer 100 and nuts 101 for adjusting the position of the washer. Interposed between the washer 100 and a washer 102 engaging the lever 80 is a coil spring 103 which surrounds the rod 99, so that the tension of said spring opposes movement of the lever 80 from the position shown in Fig. 5. The contact levers 83 and 88 are so connected to the rod 82 that when the rod is shifted to cause the engagement of the contacts 89 and 90, the contacts 84 and 85 will be separated and vice versa.

Interposed in a circuit around the contacts 89 and 90 is a manually operable switch 104 having a spring 105 tending to hold the switch in its open position. When the switch is held closed the motor 29 will be supplied with current when the switch contacts 89 and 90 are open.

In operation, a reservoir or other cylinder to be welded is brought into position in alinement with the feed rollers 11′, the members 9 and 9′ having been first adjusted so that the rollers 11 will be positioned to engage the particular sized reservoir which is to be welded, by pressing a manually operable switch 106 in the circuit of the motor 17. Said motor then operates through the shaft 16 and the bevel gears 14 and 15 to rotate the right and left hand screw-threaded rods 13 and thus cause the standards 9 with the rollers 11 to be shifted laterally.

The switch 104 is then held closed so as to energize the motor 29, causing the feed rollers 11′ to be rotated through the bevel gears 27 and 26, shaft 23, the bevel gears 22, 20, and 19. The reservoir 12 is then fed toward the center of the machine by the feed rolls 11′ until the spacer 61 enters the seam of the reservoir which is to be welded, said spacer being beveled as shown at 107 to facilitate the entrance of the spacer into the seam. A further movement of the reservoir brings same under and into contact with the electrode rod 5, so that the welding circuit is closed and the usual welding arc is formed.

The feed rolls 35 are also rotated by the motor 29 through the gears 32 and 33 and operate to feed the reservoir. As soon as the arc is formed, current passing through the electrode rod 5 also flows through the coils 78 of the magnet 75. The magnet 75 being thus energized, the armature is pulled in and the lever 80 is moved so that the rod 82 is pulled upwardly, causing the contact 84 to separate from the contact 85 and the contact 89 to engage contact 90.

The circuit through the motor 29 is therefore closed through the contacts 89 and 90, permitting the operator to release the temporary closing switch 104. When the lever 80 moves as above described, the valve stem 94 is also shifted upwardly, causing the valve 93 to move so that the exhaust port 98 is cut off from pipe 96, while the fluid pressure supply pipe 97 is connected to pipe 96. Fluid under pressure is thereupon supplied through pipe 68 to piston cylinder 42 and piston 41 is moved upwardly. The lever 38 is thereby operated to move the frame 36 and consequently the feed rollers 35 so that said rollers engage the outer surface of the cylinder 12 and since the rollers 35 are being rotated by the running of the motor 29, the cylinder or reservoir 12 is fed along as the seam is welded. Fluid under pressure is also supplied through pipe 68 to pipe 66 and piston cylinder 65, so that piston 64 is moved to its outer position, causing the spacer 61 to be elevated to the operating position, as shown in Fig. 1.

As the reservoir 12 is fed along, it is supported by the guide rollers 57 and the roller 55. The roller 55 is provided with groove 56, so that as the seam is welded, the molten metal will flow through the seam, as supplied from the electrode rod 5 and will form a bead on the under side of the seam, to correspond in contour, with the cross section of the groove.

The roller 55 is kept cool by the rotation in the liquid contained in the receptacle 58, through which cooling water circulates by way of the supply pipe 59 and the return pipe 60.

When the reservoir 12 has been fed along to the point where the arc of the electrode is broken, and the welding operation has been finished, the circuit will be broken through the electrode rod and consequently the magnet 75 will become deenergized. The spring 103 then acts on lever 80 to move same to the position shown in Fig. 5, in which the contact 89 is separated from contact 90, so that the supply of current to the motor 29 is cut off and thereby the motor is stopped and the rotation of the feed rolls 35 and 11′ ceases. The contact 84 is brought into engagement with the contact 85, so that the circuit is closed through the electric motor 74. The motor 74 then operates through the gear speed reducing mechanism 73 to rotate the ring 110 and thereby, through the connecting rod 70, to rotate the member 53.

The cylinder supporting member 54 with the cylinder 12 are then rocked to a position, such as indicated at A in Fig. 3.

The angular position of the axis of the pins 52 is such, as indicated at B in Figs. 1 and 3, that the supporting members 54 will be inclined downwardly when said members have been moved to the position indicated at A, such that the cylinder 12 will be moved by gravity and will be discharged from the machine.

In order to effect the return of the cylinder supporting mechanism to its normal supporting position, an automatic control device is provided which comprises a contact ring 110 having an arm 111 which extends to the center of the ring, said arm having a bore in which the shaft 72 is secured. A segment of the ring 110 is cut away, as shown at 112, and the central space of the ring, including the cut away portion, is filled with an insulating material 113. The connecting rod 70 is pivotally connected to the ring 110 so that said ring serves as a crank arm.

A lever arm 114 is rotatably mounted on the shaft 72 and carries a combined pawl and contact member 115, which is adapted to engage the periphery of the ring 110. The outer end of the lever arm 114 is connected to the solenoid core 116 of a solenoid coil 117, the coil 117 being in circuit with feed roll driving motor 29. A contact button 118, as shown in Fig. 1, engages the arm 111.

The contact ring 110 and the contact member 115 control the circuit of the motor 74. One lead from the motor 74 being connected to the contact member 115 and being adapted to be connected to the return wire 119 of the motor through ring 110 and the contact button 118.

Assuming the parts in the position shown in Fig. 9, when the motor 29 is energized, the solenoid coil 117 will also be energized and the solenoid core 116 will be pulled inwardly, causing the arm 114 to be rocked in a clockwise direction, until the pawl contact member 115 engages in a notch 120 cut in the ring 110. When the circuit through the electrode 5 is opened as the cylinder 12 passes beyond the electrode, the lever 80 is operated as hereinbefore described so as to open the circuit of the feed roll motor 29 and close the circuit of the motor 74 through the contacts 84 and 85. The contact member 115 engaging the notch 120, the circuit of the motor 74 will also be closed through the ring 110 and the contact button 118, so that the motor 74 is energized and rotates the shaft 72 and the ring 110, through the speed reducing device 73, in the direction shown by the arrow in Fig. 9.

The cylinder supporting members 54 are thus rocked by the operation of the connecting rod 70 and the member 53 to the position in which the cylinder 12 is discharged by gravity. The rotation of the disk 110 and the connecting rod 70 continues beyond this position, the contact member 115 being in contact with the ring 110, until the insulation section 112 engages the contact member 115, when the circuit of the motor 74 will be opened and the further rotation of the ring 110 will cease. When the parts have rotated to this position, the ring 110 has made a complete revolution, and the cylinder supporting members 54 will therefore have been returned to the normal supporting position. Upon energization of the motor 29 to start the feed rolls, the solenoid coil 117 is also energized, and the solenoid core 116 is operated to shift the lever arm 114, so that the contact member 115 is shifted to engage in the notch 120 of ring 110, thus closing the circuit of motor 74, in readiness for the next cylinder discharge movement.

When the magnet 75 is deenergized and the lever 80 is moved to the position shown in Fig. 5, the valve 93 is moved so that the supply pipe 97 is cut off from pipe 96, while the exhaust port 98 is connected to the pipe 96. The release of fluid from piston 41 permits the spring 108 to shift the piston and the lever 38 so as to cause the feed rolls 35 to be raised out of engagement with the cylinder 12. This movement is permitted, although the motor 29 is stationary and the shaft 28 and the gear 32 cannot move vertically, by reason of the gears 33 being free to rotate on the gear 32, as the frame 36 is moved vertically upward.

The exhaust of fluid from piston 64 permits the spring 109 to shift the piston rearwardly and thereby the spacer 61 is rocked out of position so as to clear any cylinder which may have been fed forward and thus permits the free movement of the spacer with the members 54 as said members are rocked to the cylinder discharging position.

The electrode feed device 47 and the electrode are maintained in a constant relation with respect to the cylinder, since the pivoted lever 48 which supports the device 47 is provided with a downwardly projecting finger 121 which is adapted to engage the upper space of the spacer 61. The spacer is mounted on the cylinder supporting members 54, so that the position of the supporting members determines the position of the feed device 47.

The set screws 43 and 44 carried by the frame 36 are adjusted so as to permit movement of the feed rolls 35 sufficient to allow the rolls to adjust themselves to the face of the cylinder 12 but at the same time they prevent excessive rocking movement of the feed rolls.

In the welding operation, the fused metal from the electrode 5 flows into the space between the edges of the cylinder which is being welded and welds the joint by one operation, a bead being formed on the under side of the joint which has a cross section corresponding with the cross section of the groove 56 in the chill roll 55.

Having now described our invention, what we claim as new and desire to secure by Letters Patent, is:—

1. In an electric seam welding machine, the combination with means for feeding a metal electrode to the seam of the work to be welded, of feed rolls for feeding the work to the electrode, an electric motor for driving said feed rolls, and means for automatically energizing said motor upon energization of said electrode.

2. In an electric seam welding machine, the combination with means for feeding a metal electrode to the seam of the work to be welded, of feed rolls for feeding the work to the electrode, an electric motor for driving said feed rolls, a switch for controlling the circuit of said motor, and means operated upon energization of said electrode for closing said switch.

3. In an electric seam welding machine, the combination with means for feeding a metallic electrode to the seam of the work to be welded, of feed rolls for feeding the work to the electrode, an electric motor for driving said feed rolls, a switch for controlling the circuit of said motor, and means operated by the flow of current to said electrode for closing said switch.

4. In an electric seam welding machine, the combination with means for electrically welding the seam of the work to be welded, of means for automatically feeding the work as the seam is welded, mechanism for shifting the work out of the line of feed, and means operated upon cessation of flow of welding current for operating said mechanism.

5. In an electric seam welding machine, the combination with means for feeding a metal electrode to the seam of the work to be welded, of feed rolls for feeding the work to the electrode, an electric motor for driving said rolls, mechanism for ejecting the work from the machine upon completion of the welding operation, an electric motor for driving said mechanism, and an electric switch device operative when current is flowing through the electrode for closing the circuit of the feed roll motor and for opening the circuit of the other motor.

6. In an electric seam welding machine, the combination with means for feeding a metal electrode to the seam of the work to be welded, of feed rolls for feeding the work to the electrode, an electric motor for driving said rolls, mechanism for ejecting the work from the machine upon completion of the welding operation, an electric motor for driving said mechanism, and an electric switch device operative to close the circuit of one motor and open the circuit of the other motor.

7. In an electric seam welding machine, the combination with means for feeding a metal electrode to the seam of a cylinder to be welded, of feed rolls for feeding said cylinder to the electrode, a movable device for supporting said cylinder in position for welding, and means for operating said device to discharge the cylinder from the machine upon completion of the welding operation.

8. In an electric seam welding machine, the combination with means for feeding a metal electrode to the seam of a cylinder to be welded, of a rotatable device for supporting said cylinder in a horizontal position as it is being welded and having its axis of rotation inclined in such manner that the supported cylinder will be downwardly inclined upon movement of the device to a discharging position, to permit the cylinder to discharge by gravity.

9. In an electric seam welding machine, the combination with means for feeding a metal electrode to the seam of a cylinder to be welded, of a rotatable device for supporting said cylinder in a horizontal position as it is being welded and having its axis of rotation inclined with respect to vertical planes extending both transversely and longitudinally of the machine.

10. In an electric seam welding machine, the combination with means for feeding a metal electrode to the seam of the cylinder to be welded, of a rotatably mounted device for supporting said cylinder as it is welded, a crank operatively connected to said device, means for operating said crank to rotate said device upon completion of the welding operation, and means for preventing the further rotation of said crank upon completion of one revolution thereof.

11. In an electric seam welding machine, the combination with means for feeding a metal electrode to the seam of the cylinder to be welded, of a rotatably mounted device for supporting said cylinder as it is welded, a crank operatively connected to said device, an electric motor for rotating said crank, and means operating upon a single rotation of said crank for opening the circuit of said motor.

12. In an electric seam welding machine, the combination with means for feeding a metal electrode to the seam of the cylinder to be welded, of a rotatably mounted device for supporting said cylinder as it is welded, a crank operatively connected to said device, an electric motor for rotating said crank, means operating upon completion of the welding operation for closing the circuit of said motor, and means operating upon completion of one revolution of said crank for opening the circuit of said motor.

13. In an electric seam welding machine, the combination with means for feeding an electrode to the seam of a cylinder to be welded, of feed rolls for feeding the cylinder to the electrode, fluid pressure operated means for holding said rolls in engagement with the cylinder during the welding operation, said fluid pressure operated means being operated upon completion of the welding operation to shift said rolls out of engagement with the cylinder.

14. In an electric seam welding machine, the combination with means for feeding the electrode to the seam of a cylinder to be welded, of feed rolls for feeding the cylinder to the electrode, mechanism operated by fluid under pressure for holding said rolls in engagement with the cylinder, and means operating upon the flow of current through the electrode for supplying fluid under pressure to said mechanism.

15. In an electric seam welding machine, the combination with means for feeding an electrode to the seam of a cylinder to be welded, of feed rolls for feeding the cylinder to the electrode, mechanism operated by fluid under pressure for holding said rolls in engagement with the cylinder, and means operating upon the flow of current through the electrode for supplying fluid under pressure to said mechanism, and upon cessation of current flow for venting fluid from said mechanism.

16. In an electric seam welding machine, the combination with an electrode for welding the seam of a cylinder, of means for feeding the cylinder to the electrode, a spacer for maintaining a space between the edges of the cylinder to be welded, and means for moving said spacer into and out of its spacing position, said means being automatically operated upon energization of said electrode for moving said spacer out of its spacing position.

17. In an electric seam welding machine, the combination with an electrode for welding the seam of a cylinder, of means for feeding the cylinder to the electrode, a spacer for maintaining a space between the edges of the cylinder to be welded, and fluid pressure operated means automatically operated by the flow of current through said electrode for moving said spacer into its spacing position.

18. In an electric seam welding machine, the combination with means for feeding an electrode to the seam of a cylinder to be welded, of feed rolls for feeding the cylinder to the electrode, a fluid pressure operated piston for moving said rolls into and out of engagement with the cylinder, a spacer for regulating the width of the space between the edges of the cylinder to be welded, a fluid pressure operated piston for moving said spacer into and out its spacing position, and means operated upon the flow of current through said electrode for controlling the fluid pressure on said pistons.

In testimony whereof we have hereunto set our hands.

JAMES A. LEEPER.
ROBERT J. STRONG.